US007844854B2

(12) United States Patent
Murty et al.

(10) Patent No.: US 7,844,854 B2
(45) Date of Patent: Nov. 30, 2010

(54) OPPORTUNISTIC TRANSMISSION OF COMPUTING SYSTEM STATE INFORMATION WITHIN A LINK BASED COMPUTING SYSTEM

(75) Inventors: Keshavram N. Murty, Phoenix, AZ (US); Madhu Athreya, Saratoga, CA (US); Richard Glass, Olympia, WA (US); Tessil Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1392 days.

(21) Appl. No.: 11/174,010

(22) Filed: Jun. 30, 2005

(65) Prior Publication Data

US 2007/0005944 A1   Jan. 4, 2007

(51) Int. Cl.
*G06F 11/00* (2006.01)
(52) U.S. Cl. .................. 714/9; 714/30; 714/39
(58) Field of Classification Search .......... 714/9
See application file for complete search history.

(56) References Cited

U.S. PATENT DOCUMENTS

| 5,669,002 | A | | 9/1997 | Buch et al. |
| 5,819,093 | A | * | 10/1998 | Davidson et al. ............ 717/126 |
| 5,918,004 | A | * | 6/1999 | Anderson et al. ............ 714/38 |
| 6,003,143 | A | | 12/1999 | Kim et al. |
| 6,009,488 | A | | 12/1999 | Kavipurapu |
| 6,175,814 | B1 | * | 1/2001 | Chrysos et al. ............ 702/182 |
| 6,397,382 | B1 | | 5/2002 | Dawson |
| 6,477,683 | B1 | | 11/2002 | Killian et al. |
| 6,671,825 | B1 | * | 12/2003 | Joshi et al. ................. 714/38 |
| 7,003,698 | B2 | | 2/2006 | Glass |
| 7,065,481 | B2 | | 6/2006 | Schubert et al. |
| 7,337,365 | B2 | * | 2/2008 | Zunino et al. ............... 714/38 |
| 7,401,322 | B1 | | 7/2008 | Shagam et al. |
| 2004/0078685 | A1 | * | 4/2004 | Glass ........................ 714/38 |
| 2004/0243883 | A1 | * | 12/2004 | Shankar et al. .............. 714/38 |
| 2006/0155843 | A1 | | 7/2006 | Glass |
| 2006/0156065 | A1 | | 7/2006 | Glass |
| 2006/0294427 | A1 | | 12/2006 | Glass |

OTHER PUBLICATIONS

"Notice of Allowance" for U.S. Appl. No. 11/773,995 mailed Nov. 17, 2009 and corresponding allowed claims (Jul. 15, 2009), 11 pages.

* cited by examiner

*Primary Examiner*—Michael C Maskulinski
(74) *Attorney, Agent, or Firm*—Blakely, Sokoloff, Taylor & Zafman LLP

(57) ABSTRACT

A method is described that involves within a link based computing system, opportunistically transmitting, into a network utilized by components of the link based computing system, one or more packets that contain computing system state information. The computing system state information includes software state information created through execution of software by said link based computing system. The method also involves collecting the computing system state information at a monitoring and/or debugging system attached to the link based computing system in order to analyze the link based computing system's operation.

19 Claims, 8 Drawing Sheets

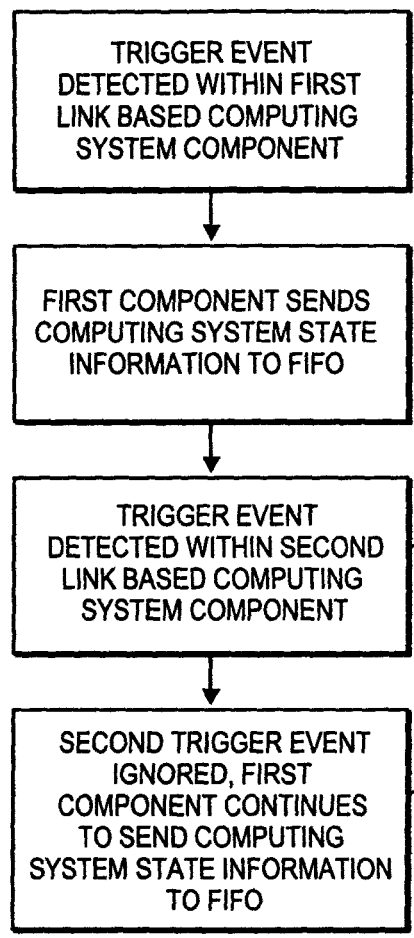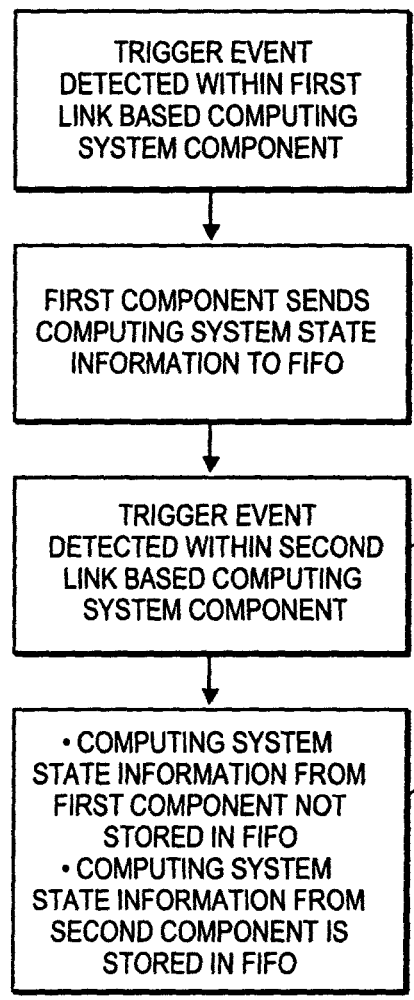
NON-PRE-EMPTIVE
FIG. 7A
PRE-EMPTIVE
FIG. 7B

US 7,844,854 B2

OPPORTUNISTIC TRANSMISSION OF COMPUTING SYSTEM STATE INFORMATION WITHIN A LINK BASED COMPUTING SYSTEM

FIELD OF INVENTION

The field of invention relates generally to the monitoring of computing systems, and, more specifically, to the opportunistic transmission of computing system state information within a link based computing system.

BACKGROUND

FIG. 1a shows a depiction of a bus 120. A bus 120 is a "shared medium" communication structure that is used to transport communications between electronic components 101a-10Na and 110a. Shared medium means that the components 101a-10Na and 110a that communicate with one another physically share and are connected to the same electronic wiring 120. Thus, for example, if component 101a wished to communicate to component 10Na, component 101a would send information along wiring 120 to component 10Na; if component 103a wished to communicate to component 110a, component 103a would send information along the same wiring 120 to component 110a, etc.

Computing systems have traditionally made use of busses. With respect to certain IBM compatible PCs, bus 120 may correspond to a PCI bus where components 101a-10Na correspond to "I/O" components (e.g., LAN networking adapter cards, MODEMs, hard disk storage devices, etc.) and component 110a corresponds to an I/O Control Hub (ICH). As another example, with respect to certain multiprocessor computing systems, bus 120 may correspond to a "front side" bus where components 101a-10Na correspond to microprocessors and component 110a corresponds to a memory controller.

In the past, when computing system clock speeds were relatively slow, the capacitive loading on the computing system's busses was not a serious issue because the degraded maximum speed of the bus wiring (owing to capacitive loading) still far exceeded the computing system's internal clock speeds. The same cannot be said for at least some of today's computing systems. With the continual increase in computing system clock speeds over the years, the speed of today's computing systems are reaching (and/or perhaps exceeding) the maximum speed of wires that are heavily loaded with capacitance such as bus wiring 120.

Therefore computing systems are migrating to a "link-based" component-to-component interconnection scheme. FIG. 1b shows a comparative example vis-à-vis FIG. 1a. According to the approach of FIG. 1b, computing system components 101a-10Na and 110a are interconnected through a mesh 140 of high speed bidirectional point-to-point links $130_1$ through $130_N$. A bi-directional point-to-point link typically comprises a first unidirectional point-to-point link that transmits information in a first direction and a second unidirectional point-to-point link that transmits information is a second direction that is opposite that of the first direction.

Each point-to-point link can be constructed with copper or fiber optic cabling and appropriate drivers and receivers (e.g., single or differential line drivers and receivers for copper based cables; and LASER or LED E/O transmitters and O/E receivers for fiber optic cables; etc.). The mesh 140 observed in FIG. 1b is simplistic in that each component is connected by a point-to-point link to every other component. In more complicated schemes, the mesh 140 is a network having routing/switching nodes. Here, every component need not be coupled by a point-to-point link to every other component.

Instead, hops across a plurality of links may take place through routing/switching nodes in order to transport information from a source component to a destination component. Depending on implementation, the routing/switching function may be a stand alone function within the mesh network or may be integrated into a substantive component of the computing system (e.g., processor, memory controller, I/O unit, etc.). According to one perspective, the term "link agent" is used to refer to a component of a link based computing system that includes any such substantive component.

FIGURES

The present invention is illustrated by way of example and not limitation in the figures of the accompanying drawings, in which like references indicate similar elements and in which:

FIGS. 7a and 7b show different modes for dealing with a conflict situation in which two different components detect a trigger event;

DETAILED DESCRIPTION

Figure 1A:
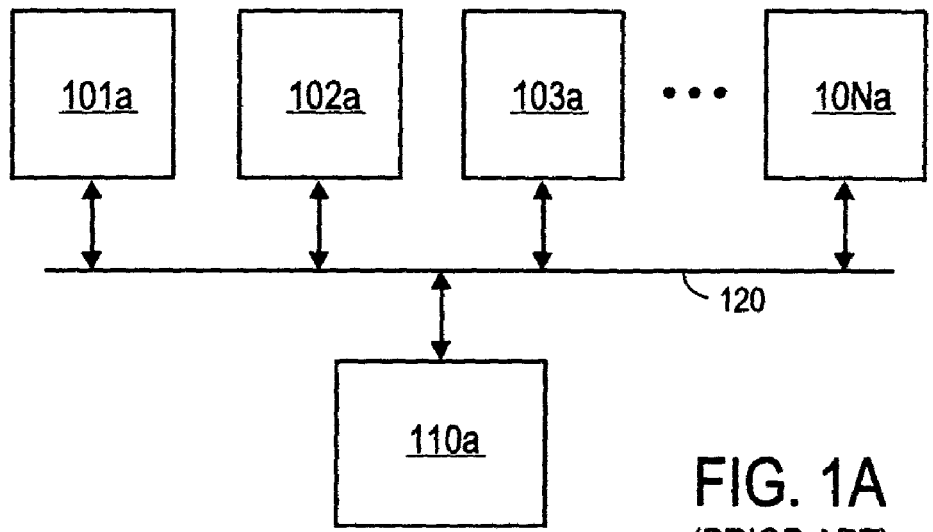
FIG. 1a (prior art) shows a bus between computing system components.
Figure 1B:
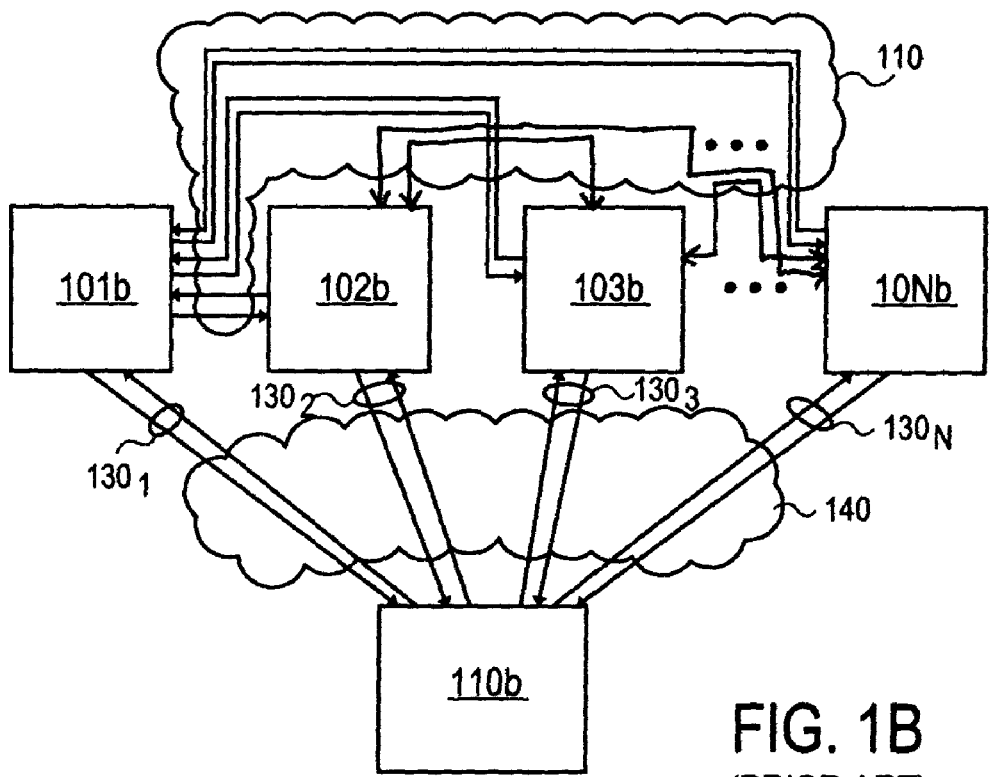
FIG. 1b (prior art) shows bidirectional links between computing system components.
Figure 2:
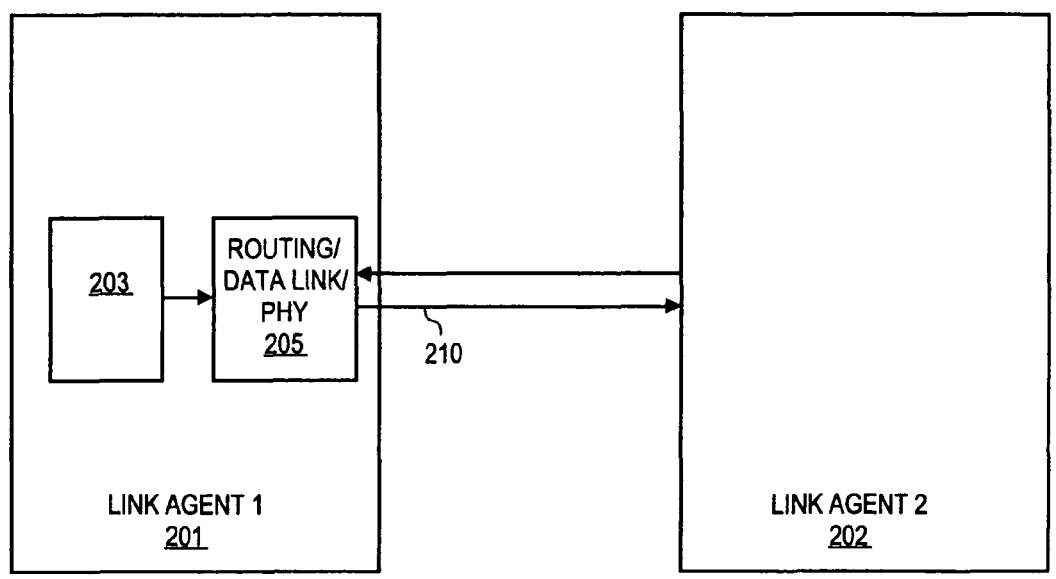
FIG. 2 (prior art) shows a link agent having a component.

FIG. 2 shows a basic architectural perspective of a link agent 201 having a computing system component 203, where, the component 203 may be any component commonly found in a computing system such as a processor (also referred to as a "CPU"), a memory controller, an I/O hub, a cache controller, etc. According to the basic architectural perspective of FIG. 2, the computing system component 203 interfaces to an architectural layer 205 that essentially performs the "networking" tasks for the link agent.

These tasks generally include routing/switching layer tasks (e.g., identification of which node an outgoing packet is to be directed to), data-link layer tasks (e.g., assurance that corrupted information is not accepted from a link) and physical layer tasks (e.g., implementation of an encoding scheme to reduce the susceptibility of transported information to corruption). For simplicity, architectural layer 205 will be referred to more simplistically as the RDP layer 205 (for routing/switching, data-link and physical layers). The RDP layer 205 is made primarily of logic circuitry. In an implementation, the component 203 is primarily made of logic circuitry as well. If a situation arises in which a packet needs to be sent from the component 203 to some other link agent, the RDP layer prepares the packet and sends it over the appropriate link (such as link 210).

The debugging and/or monitoring of a computing system is enhanced if the "state" of the computing system is somehow made visible to a debugging and/or monitoring system (such as a logic analyzer).

The state of a computing system includes at least a portion of either or both of its software state information and hardware state information. In the case of its software state information, it is pertinent to realize that the execution and/or deployment of software code typically involves the assignment of specific values to certain variables. Software state information is basically viewed as any of these specific values as they exist at a specific moment during the software code's execution (e.g., at a specific instant of time, at entry and/or exit of a specific branch or function call within the code's flow, etc.). By tracking these values at different instances over the software code's "runtime", the operation of the software code itself can be "traced".

In the case of hardware state information, hardware state information essentially corresponds to the information stored in register or memory locations (more generically, "storage space") found within the computing system. Note that hardware state information and software state information may overlap in cases where a specific value stored in a register and/or memory is directly determined by software code (e.g., the code itself is written to determine a value and that value is stored in register space and/or memory space). There often exist, however, other types of information stored in register(s) or memory that are not determined by (or even visible to) a computing system's software code (e.g. micro-architectural state information).

For instance, logic circuitry can often be viewed as a collection of "state machines", where, each state machine includes at least some register storage space. The logic circuitry "works" at least partially through one or more of its constituent state machines reacting to input stimuli that cause the "state" of the state machine (which corresponds to the content of the state machine's register) to change, which, in turn, helps to effect a new set of input stimuli for the state machine as well as one or more other "downstream" state machines as well. Here, in order to debug a computing system, it may be desirable to view the state of these registers at a specific moment (or at least time range) in the logic circuitry's execution so that any defect in proper operation can be identified. For example, if an "incorrect" state machine state is detected, the problem being debugged may be directly related to the state machine input condition that created the incorrect state.

The question therefore arises as to how to handle the problem of exposing software and/or hardware state information within a link based computing system to monitoring and/or debugging equipment. For simplicity, the term "computing system state information" (or simply, "computing system state") will be used to refer to software state information and/or hardware state information.

Computing systems operate in a sequential nature timed by one or more clock reference signals. For a particular region of software and/or hardware whose operation is timed by a particular clock, some aspect of the state information of the software and/or hardware is apt to change with each clock cycle. As such, an operating computing system is often characterized as a sequence of computing system states, where, each computing system state corresponds to a particular clock cycle, and, each clock cycle brings about some change in some portion of the computing system state.

The monitoring and/or debugging of a computing system typically involves the tracking or recording of consecutive computing system states over a run time of (typically consecutive) clock cycles. By analyzing the specific changes that occurred within the computing system state information, correct operation can be verified and incorrect operation can be identified. For example, if a specific "first" computing system state should have caused the computing system to enter a specific, different "second" computing system state on a following clock cycle, improper operation of the computing system state can be identified if the recorded state information fails to show the expected sequence of the first computing system state followed by the second computing system state on a next cycle.

In this light, in order to monitor and/or debug a computing system, a computing system should be designed with some mechanism that exposes sequential instances of pertinent state information that were generated by the computing system over some run time (e.g., over a specific number of consecutive clock cycles) to monitoring/debugging equipment. For example, if a link agent is designed with circuitry and/or software that "dumps" a number of consecutive computing system states to monitoring/debugging equipment that has been attached to the link based computing system is some way, the link agent essentially permits the computing system to be debugged at least from the perspective of the operation of the link agent.

Although the timing of a link based computing system's operation could conceivably be based on a single master clock that is distributed across the entire computing system, in a preferred embodiment, the operation of each link agent (at least above the physical layer(s) of its link(s)) will be timed according to one or more clocks that are local to the link agent 201. In this case, the computing system state information of a link agent 201 is expected to be a sequence of computing system states generated with the pertinent clock(s) generated by the link agent 201.

Figure 3:
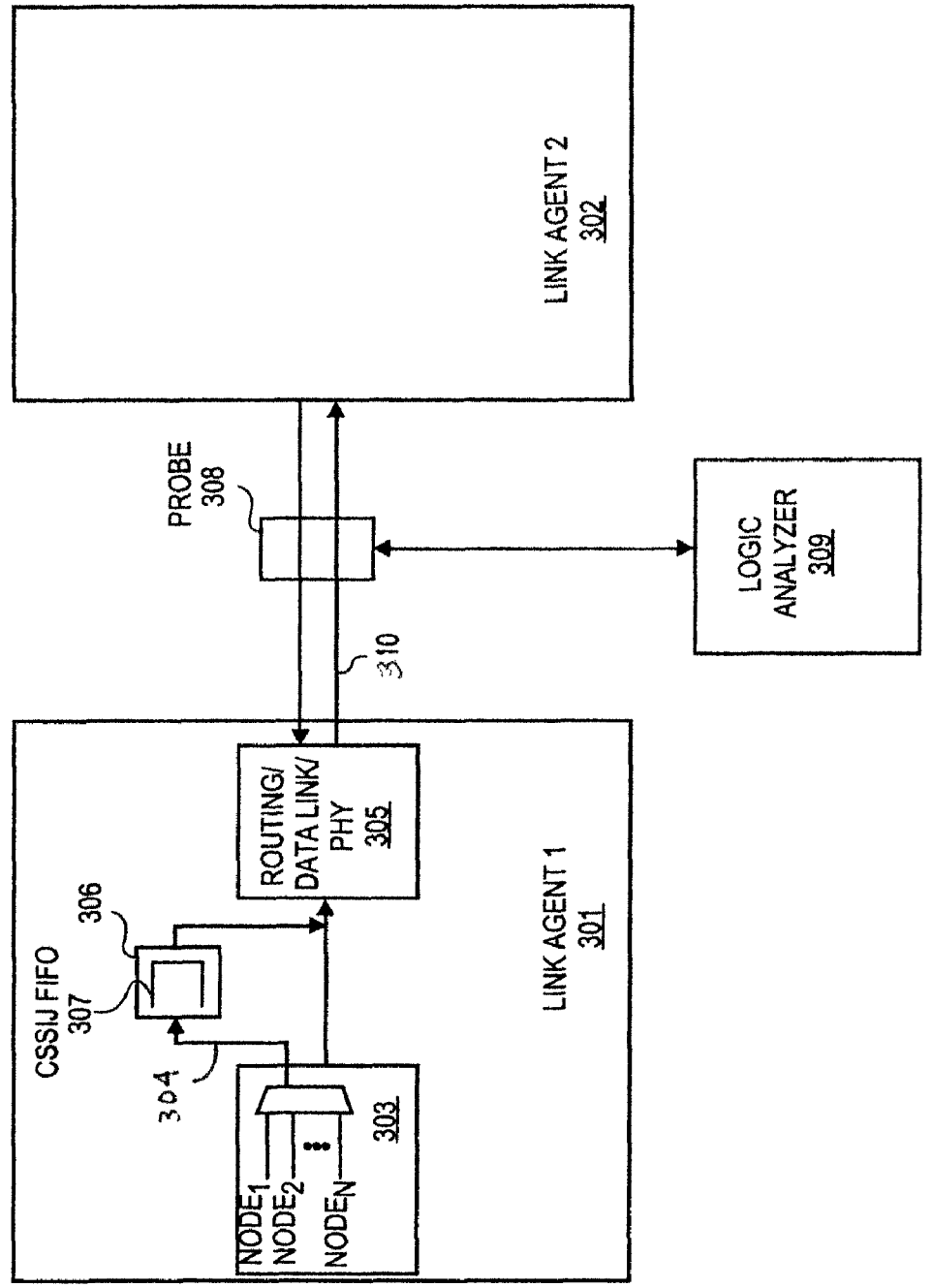
FIG. 3 shows a link agent having a component that can externally expose its computing system state information.

FIG. 3 presents a link agent architecture suitable for exposing sequential instances of computing system state information by placing such computing system state information into one or more packets that are placed on a link 310. After the state information has been placed into the link based computing system's network, the one or more packets containing state information can be "snooped" by monitoring and/or debugging equipment that are attached to at least one of the computing system's links. FIG. 3 shows a simplistic situation in which exemplary monitoring/debugging equipment (logic analyzer 309) is attached to the same link 310 (through probe 308) that computing system state information for component 303 is first placed on. In other implementations it would not be uncommon if the monitoring/debugging equipment happened to be coupled to a more remote link.

According to the architecture of FIG. 3, a "computing system state injection" (CSSIJ) queue 307 is used to store computing system state information that is controlled by component 303. According to one approach, sequential (e.g., consecutive) cycles worth of computing system state information used by component 303 are "observed" (e.g., on one or more busses and/or nodes internal to the component 303 and/or coupled to the component) without disturbing the component 303 (e.g., by simply viewing the activity on the one or more busses and/or nodes) and forwarded to the CSSIJ queue 307 (e.g., through data path 304).

According to one approach, the logic circuitry of the component 303 includes trigger logic that is capable of identifying a "looked-for" element of the computing system's state (e.g., a specific value in a specific register). When the looked for state element is detected by the trigger logic, the component 303 begins to provide at least a portion of its computing system state information along data path 304. The state information subsequently enters queue 307. According to one mode of operation, the component 303 continues to churn out computing state information along data path 304 for each pertinent clock cycle after the trigger event until queue 307 is "full". According to another mode of operation, state information is continuously dumped into the queue during normal operation and a trigger event is used to stop the collection activity (depending on a further mode setting, immediately, or, at some later time).

Moreover, in a further implementation, logic circuitry 306 associated with the CSSIJ queue 307 and the RDP layer 305 is responsible for "opportunistically" transmitting an appropriate number of packets that contain the queue's computing system state information into the computing system's network. The state information is then "snooped" off the network and analyzed.

Here, "opportunistically" can be interpreted to mean "when the appropriate link is idle". The appropriate link is the link (or links) upon which packets containing computing system state information to be snooped are first placed on. In the example of FIG. 3, the appropriate link is link 310. By refusing to send packets containing the SSIJ register's contents unless link 310 is idle, the injection of software state information into the computing system's network should prevent the network from being "bogged down" or "perturbed" with debugging/monitoring information that may change traffic flow or event sequences within the system's processor (s). As such, the performance of the computing system as whole should not be adversely affected even though its network is not only transporting the computing system's own working traffic, but also, additional information used to trace its operation.

In an implementation, the logic analyzer 309 and probe 308 used to snoop the packets containing software state information off of link 310 are as described in co-pending U.S. patent application Ser. No. 11/026,907, filed Dec. 30, 2004, entitled "Correlation Technique For Determining Relative Times Of Arrival/Departure Of Core Input/Output Packets Within A Multiple Link-Based Computing System" by Richard J. Glass; and U.S. patent application Ser. No. 11/027,116, Filed Dec. 30, 2004, entitled "Information Transportation Scheme From High Functionality Probe To Logic Analyzer" by Richard J. Glass and Muraleedhara Navada.

Figure 4:
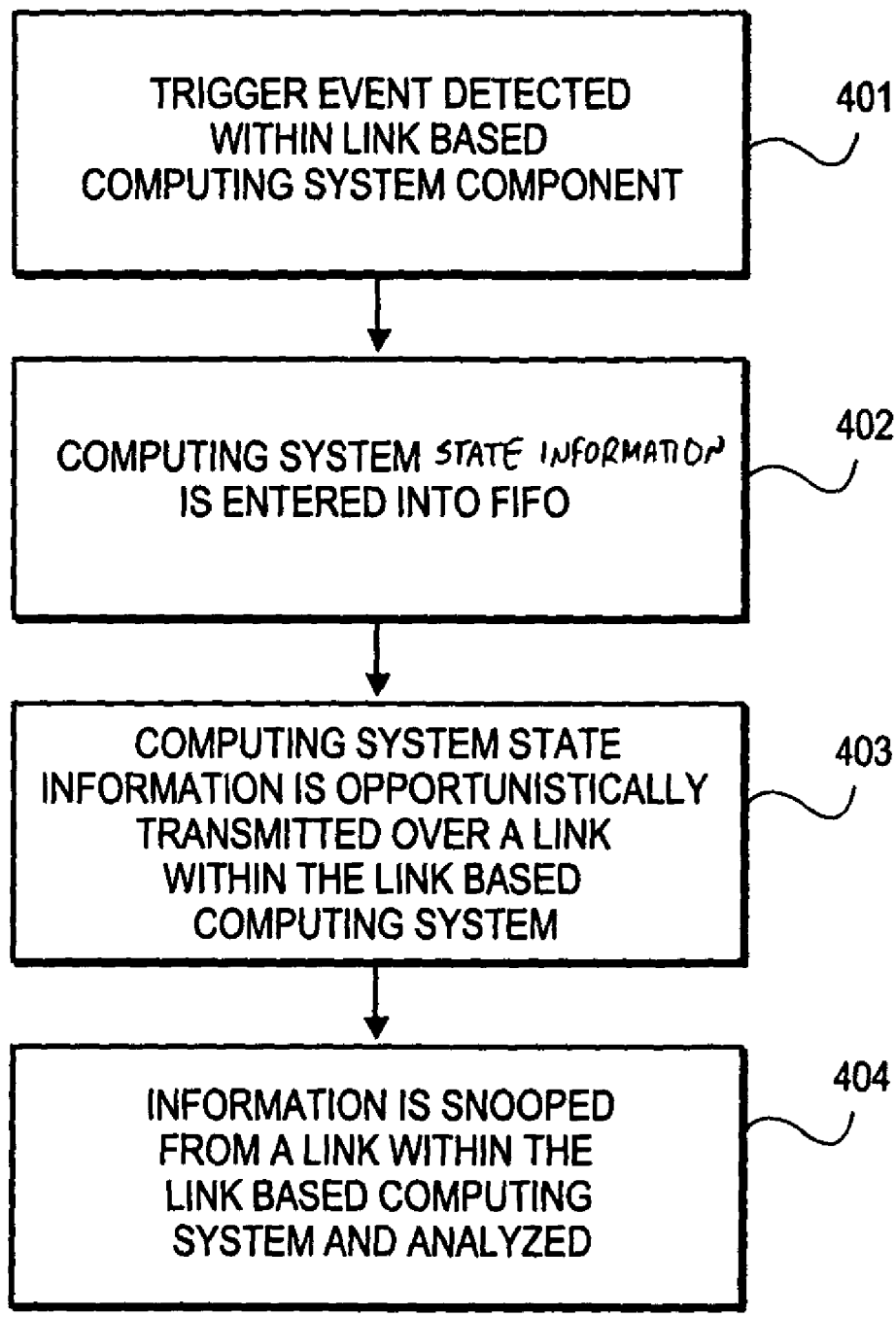
FIG. 4 shows a method for exposing computing system state information within a link based computing system.

FIG. 4 shows a method for collecting computing system state information within a link based computing system as described just above. According to the embodiment of FIG. 4, a trigger event is detected by a component within a link based computing system 401. The trigger event may be detected in hardware or, conceivably, in software (in the case where the component is or contains a processor) that is running on the component. An embodiment of trigger detection logic used for trigger detection within the component logic circuitry is shown in more detail below with respect to FIG. 5.

Here, recalling the discussion above with respect to FIG. 3, note that a trigger event may correspond to an element of the component's state information—rather than all of the component's state information. That is, for instance, of all the register and memory space controlled by the component 302, only a portion of this space is monitored to detect a trigger event. Here those of ordinary skill will be able to determine what registers and/or memory locations are worthy of using as a basis for detecting a trigger event within a specific type of component (e.g., an instruction address bus in a processor, a data bus or address bus within a cache controller or memory controller, etc.).

Moreover, the specific registers and/or memory spaces whose content is forwarded into queue 307 after a trigger event is detected (i.e., the specific portions of the computing system state that are entered into the queue 307 after a trigger event) may represent less than all of the component's entire computing system state information. Again, those of ordinary skill will be able to determine which portions of the component's computing system state information are pertinent for debugging and/or monitoring, and, be able design the component 302 such that the affected registers and/or memory spaces are designed with a path out of the component so that their corresponding content can be transferred into queue 307 after a trigger event arises (FIG. 3 depicts a simple multiplexer scheme that forward content from critical nodes/busses to data path 304).

In response to the detection of the trigger event 402, the component's 302 pertinent computing system state information is entered into queue 402. In an implementation, as discussed above, the pertinent computing system state information is entered for a series of consecutive clock cycles so that changes in the information over time can be later analyzed by the monitoring/debugging equipment. When a link that the software state information is to be placed on becomes idle, one or more packets containing the software state information are placed onto the link 403. In an implementation, a plurality of packets are prepared and sent at least if the contents of a full queue 307 are to be transmitted (e.g., one packet per clock cycle's worth of state information), and, a separate determination of link idleness is made prior to each packet's placement on the link. The information is then snooped from the computing system's network and analyzed to comprehend the computing system state information 404.

Figure 5:
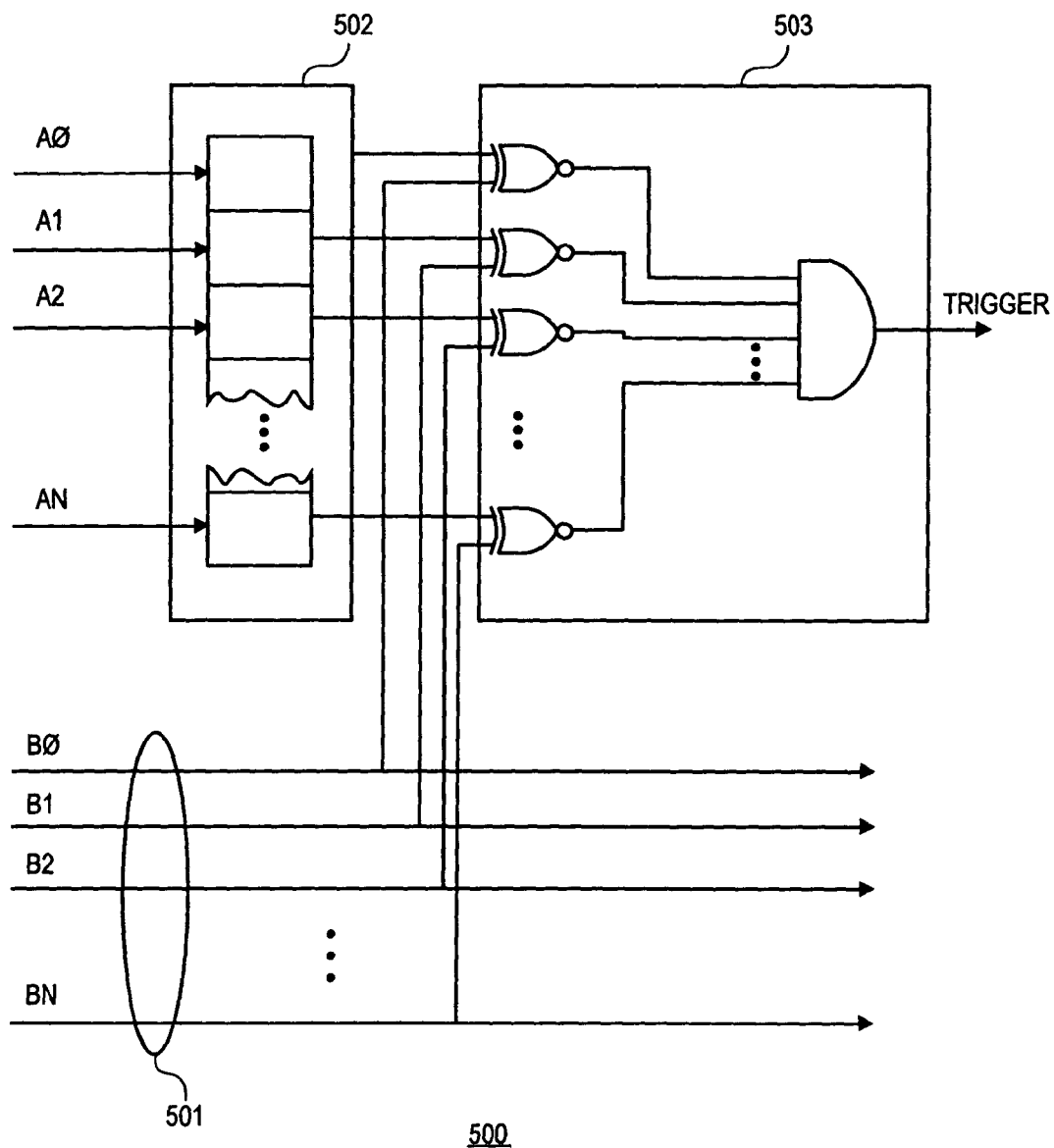
FIG. 5 (prior art) shows logic circuitry for detecting a trigger event.

FIG. 5 shows a depiction of trigger detection circuitry 500. According to the depiction of FIG. 5, "looked for" state information that, upon its detection will trigger a trigger event is programmed into register 502. The register 502 should be made externally available so that the trigger worthy state information can be routed through the network and programmed into the register 502 (e.g., from remote debugging and/or monitoring equipment). According to the implementation of FIG. 5, bus 501 is configured to be monitored for detection of the trigger event. Combinatorial logic circuitry 503 actually detects the trigger event. Each bit of the bus, and a corresponding bit from the register 502, is routed to a comparator (XNOR gate). If each comparator detects a match, then, a trigger event is raised at the TRIGGER output.

Figure 6:
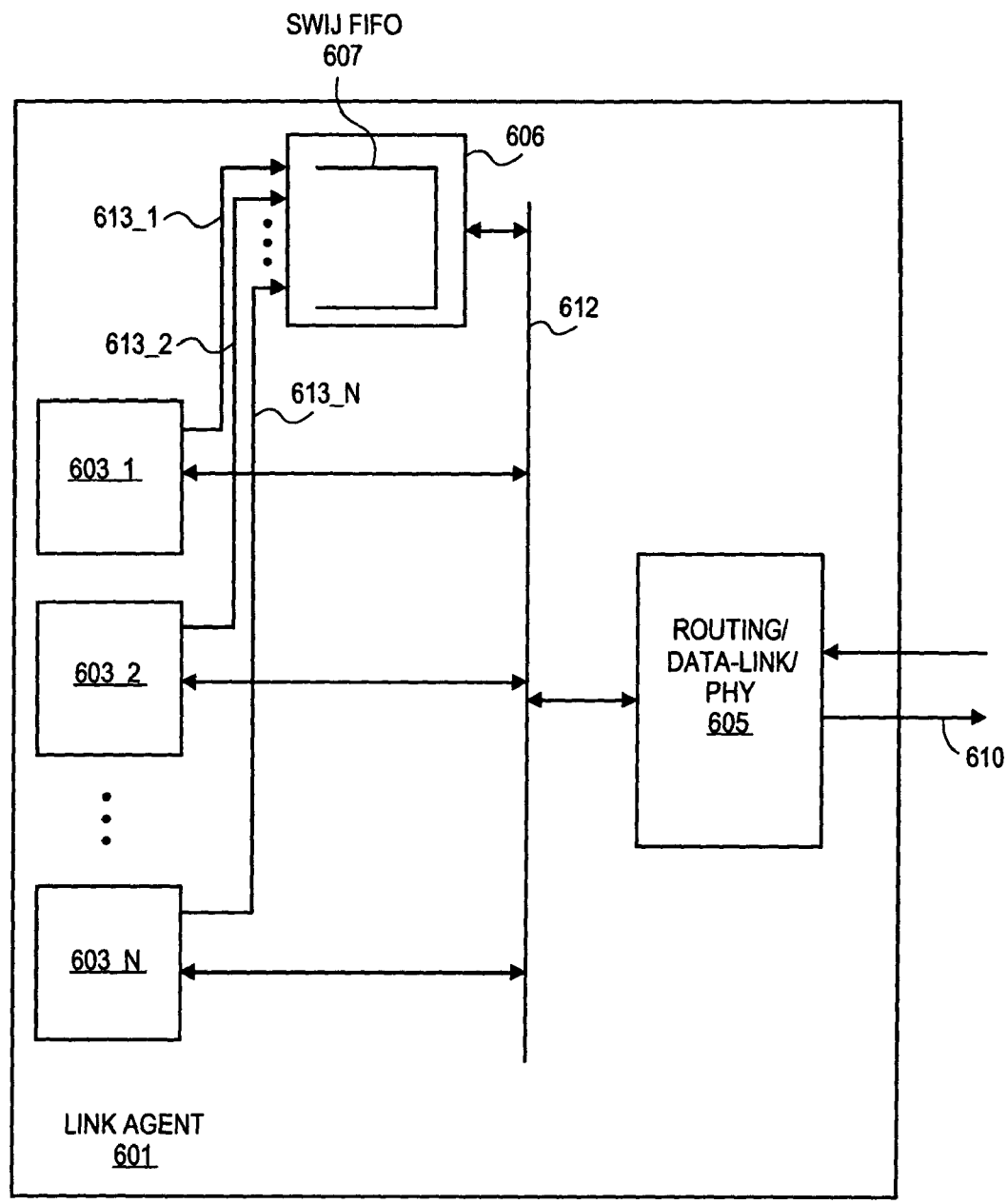
FIG. 6 shows a detailed embodiment of a link agent having multiple components each of which can externally expose their computing system state information.

FIG. 6 shows a more detailed depiction of a link agent 601. Importantly, the link agent 601 contains more than one components 603_1 through 603_M. Here, each one of components 603_1 through 603_M may be any one of the various types of components found in a computing system such as a processor, a memory controller coupled to a memory, a cache controller coupled to a cache, an I/O hub, etc. During the computing system's normal operation, each of the components 603_1 through 603_M is capable of generating information to be packetized and sent into the computing system's network by the link agent's RDP layer 605 (e.g., according to the perspective of FIG. 5, the components of a single link agent are characterized at least by identifying the RDP layer that they each use).

However, for efficiency reasons, computing system state information that is to be observed by monitoring/debugging equipment is entered into a single CSSIJ queue 607 irrespective of which of the M components generated the information. That is, in a sense, the CSSIJ queue 607 is "shared" amongst the M components. In an implementation, the logic circuitry 606 that is associated with the CSSIJ queue 607 is built to have one or more modes for dealing with a "conflict" situation in which two different components detect a trigger event close enough in time such that the later triggered component wishes to begin loading its computing system state information into the CSSIJ queue 607 before the earlier triggered component has finished loading its computing system state information into the queue 607. Two such modes are demonstrated in the flow diagrams of FIGS. 7a and 7b: "non-pre-emptive" (demonstrated in FIG. 7a) and "pre-emptive" (demonstrated in FIG. 7b).

According to a first mode depicted in FIG. 7a that is referred to as "non-pre-emptive", the second trigger event 701 is essentially ignored 702 at least until the earlier triggered component is finished writing its state information into the queue 607. According to a second mode depicted in FIG. 7b, referred to as "pre-emptive", in response to a second trigger event 703 at the later triggered component, the later triggered component begins 704 to load its information into queue 607 and the earlier triggered component's state information stops being loaded into the queue 607. In this case, in a situation where the loading of the queue "stops" once the queue is full, note that when the queue is full there will be state information from different components within the queue at the same time.

In a further implementation, referring back to FIG. 6, the computing system as a whole comprehends different types of packets. Specifically, in order to implement a credit based flow control scheme, packets are broken down into smaller packets (called "flits" or "cells") that are actually transmitted over the network. Moreover, a single "computing system state injection" packet (i.e., a packet containing computing system state information for debug/monitoring purposes) may consist of more than one flit.

The RDP layer 505, through "flit" bus 612, services each of the M components 603_1 through 603_M and the logic circuitry associated with the CSSIJ register queue 607. Here, if a component needs to send a packet into the network, the processor will pass the flit payloads for the packet over bus 612 to RDP layer 605. The RDP layer then places the flits into the network (e.g., by placing them on link 610). Note that the RDP layer 605 may be coupled to multiple links.

Figure 8:
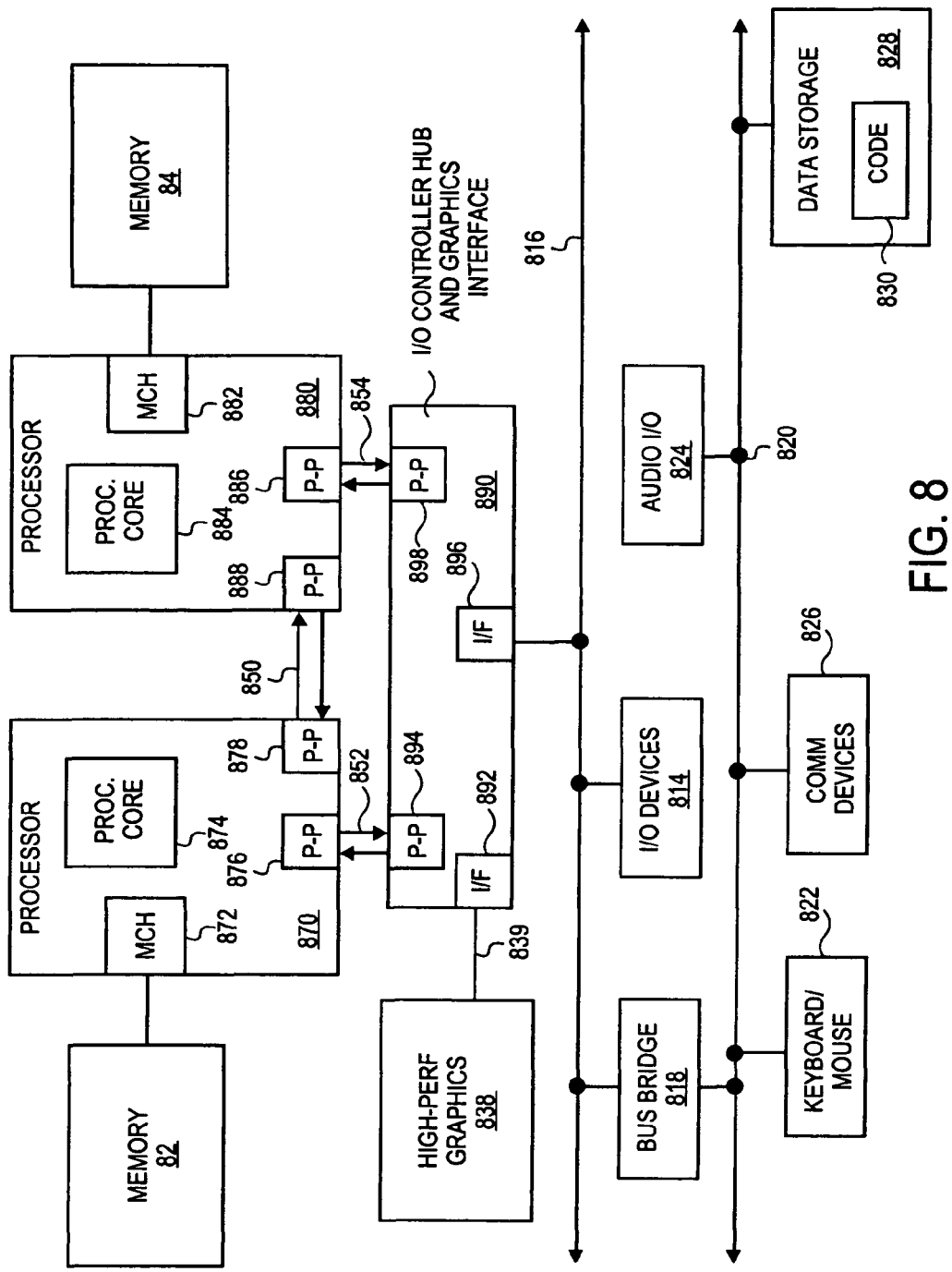
FIG. 8 shows an embodiment of a link based computing system.

FIG. 8 illustrates a link based computer system that is arranged to have bidirectional links between its various components. In particular, FIG. 8 shows a system where various components such as processors, memory, and input/output devices are interconnected by a number of bi-directional links. The system of FIG. 8 may also include several processors, of which only two, processors 870, 880 are shown for clarity. Processors 870, 880 may each include a local memory controller hub (MCH) 872, 882 to connect with memory 82, 84. Processors 870, 880 may exchange data via a bidirectional link 850 using bidirectional link interface circuits 878, 888. Processors 870, 880 may each exchange data with an I/O control hub and graphics interface component 890 via individual bi-directional links 852, 854 using bi-directional link interface circuits 876, 894, 886, 898. Component 890 may also exchange data with a high-performance graphics circuit 838 via a high-performance graphics interface 839. In this particular implementation, each of components 870, 880, 890 may be regarded as a separate link agent.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behavioral level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
within a link based computing system, opportunistically transmitting, into a network utilized by components of said link based computing system, one or more packets that contain computing system state information, said computing system state information containing software state information created through execution of software by said computing system; and,
collecting said computing system state information at a monitoring and/or debugging system attached to said link based computing system with a probe connected to one of said link based computing system's links in order to analyze said link based computing system's operation, said probe located between a transmitting agent and receiving agent of said link within said link based computing system.

2. The method of claim 1 comprising generating said computing system state information with a processor within said link based computing system.

3. The method of claim 1 comprising generating said computing system state information with a memory controller within said link based computing system.

4. The method of claim 1 comprising generating said computing system state information with a cache controller within said link based computing system.

5. The method of claim 1 comprising generating said computing system state information with an I/O hub within said link based computing system.

6. The method of claim 1 further comprising:
generating said computing system state information with a component within said link based computing system; and,
entering said computing system state information into a queue prior to said transmitting of said computing system state information.

7. The method of claim 6 wherein said entering is triggered by a trigger event detected by said component.

8. The method of claim 7 further comprising:
detecting a second trigger event with a second component; and, in response to said detecting of said second trigger event, stopping said entering and initiating entering into said queue of computing system state information generated by said second component.

9. The method of claim 7 further comprising:

detecting a second trigger event with a second component; and, even though said second trigger event occurred, continuing with said entering and not entering into said queue computing system state information generated by said second component.

10. An apparatus, comprising:

a queue and a component for a link based computing system, said queue having an input coupled to first storage space within said component, said queue to receive computing system state information of said computing system stored by said component within said first storage space upon detection of a looked for trigger condition stored in second storage space within said component, said computing system state information comprising software state information created through execution of software by said link based computing system, said component being one of: a memory controller, a cache controller, an I/O hub.

11. The apparatus of claim 10 wherein said first storage space is implemented with a register.

12. The apparatus of claim 10 wherein said first storage space is implemented with a memory.

13. The apparatus of claim 10 wherein said second storage space is implemented with a register.

14. The apparatus of claim 10 wherein said second storage space is implemented with a memory.

15. An apparatus, comprising:

a queue and a component for a link based computing system, said queue having an input coupled to first storage space within said component, said queue to receive computing system state information of said computing system stored by said component within said first storage space upon detection of a looked for trigger condition stored in second storage space within said component, said computing system state information comprising software state information created through execution of software by said link based computing system, said component being one of: a memory controller, a cache controller, an I/O hub, logic circuitry downstream from an output of said queue, said logic circuitry to perform data link layer and physical layer tasks on a packet containing said computing system state information; and, a cable downstream from said logic circuitry to transport said packet, said logic circuitry to control opportunistic transmission of said packet on said cable.

16. The apparatus of claim 15 wherein said first storage space is implemented with a register.

17. The apparatus of claim 15 wherein said first storage space is implemented with a memory.

18. The apparatus of claim 15 wherein said second storage space is implemented with a register.

19. The apparatus of claim 15 wherein said second storage space is implemented with a memory.

* * * * *